MULTIPLE-DISK REFLECTED BINARY ENCODER

Filed Nov. 27, 1959 2 Sheets-Sheet 1

INVENTOR.
MARTIN ZISERMAN
BY Henry L. Shenier
ATTORNEY

Nov. 10, 1964 M. ZISERMAN 3,156,911

MULTIPLE-DISK REFLECTED BINARY ENCODER

Filed Nov. 27, 1959 2 Sheets-Sheet 2

INVENTOR.
MARTIN ZISERMAN
BY Henry L. Shenier
ATTORNEY

United States Patent Office 3,156,911
Patented Nov. 10, 1964

3,156,911

MULTIPLE-DISK REFLECTED BINARY ENCODER

Martin Ziserman, Hartsdale, N.Y., assignor to United Aircraft Corporation, East Hartford, Conn., a corporation of Delaware Filed Nov. 27, 1959, Ser. No. 855,740
10 Claims. (Cl. 340—347)

My invention relates to a multiple-disk reflected binary encoder and more particularly to an analogue-to-digital converter which provides an unambiguous count in the reflected binary code on a plurality of reduction-geared pattern disks.

In the prior art it has been appreciated that the capacity of encoders may be greatly increased by the provision of a plurality of reduction-geared pattern disks. The maximum count is increased by a factor which is equal to the gear ratio used. This has created the problem of eliminating ambiguities due to backlash in the gear reduction train and due to uncertainty in the locations of the transfer points between the various elements of the patterns. In converters of the prior art employing but a single disk, it has been found expedient to eliminate ambiguity problems by employing the reflected binary code. This code is also termed cyclic binary and Gray. In the reflected binary, cyclic binary, or Gray code only one digit changes polarity at each transfer point. In order to eliminate ambiguities in a multiple-pattern reflected binary encoder, the prior art has proposed the conversion of the reflected binary count into a natural binary count. The conversion of count from one code into another requires considerable external logic equipment which is both expensive and unreliable because of electronic complexity.

One object of my invention is to provide a high capacity encoder having a large maximum count in the reflected binary code by the provision of a plurality of reduction-geared pattern disks.

Another object of my invention is to provide a multiple-disk encoder providing a reflected binary count without ambiguity due either to backlash in the reduction gearing or to uncertainty in the precise locations of elements of the pattern occasioned by normal manufacturing tolerances in construction.

A further object of my invention is to provide a multiple-disk reflected binary encoder which provides an unambiguous count without the necessity of converting the reflected binary count into a natural binary count.

Still a further object of my invention is to provide a multiple-disk unambiguous reflected binary encoder of inexpensive construction and reliable operation.

Other and further objects of my invention will appear from the following description.

In general my invention contemplates the provision of a high speed disk having the conventional reflected binary or Gray code pattern. All bits generated by the pattern are directly employed to produce the output representation except the most significant bit. The most significant bit is used to generate a pair of complementary signals of opposite polarity or condition such that when one represents a "1" the other represents a "0" and vice versa. I also provide a low speed disk which is coupled by reduction gearing to the high speed disk. The two complementary signals representing what would ordinarily be the most significant bit of the high speed disk are coupled to the pattern of the low speed disk. The alternate stepping action of the pair of complementary signals coupled to the low speed disk increases the tolerances and eliminates ambiguities in the low speed pattern bits.

In the accompanying drawings which form part of the instant specification and which are to be read in conjunction therewith and in which like reference numerals are used to indicate like parts in the various views.

Figure 1:
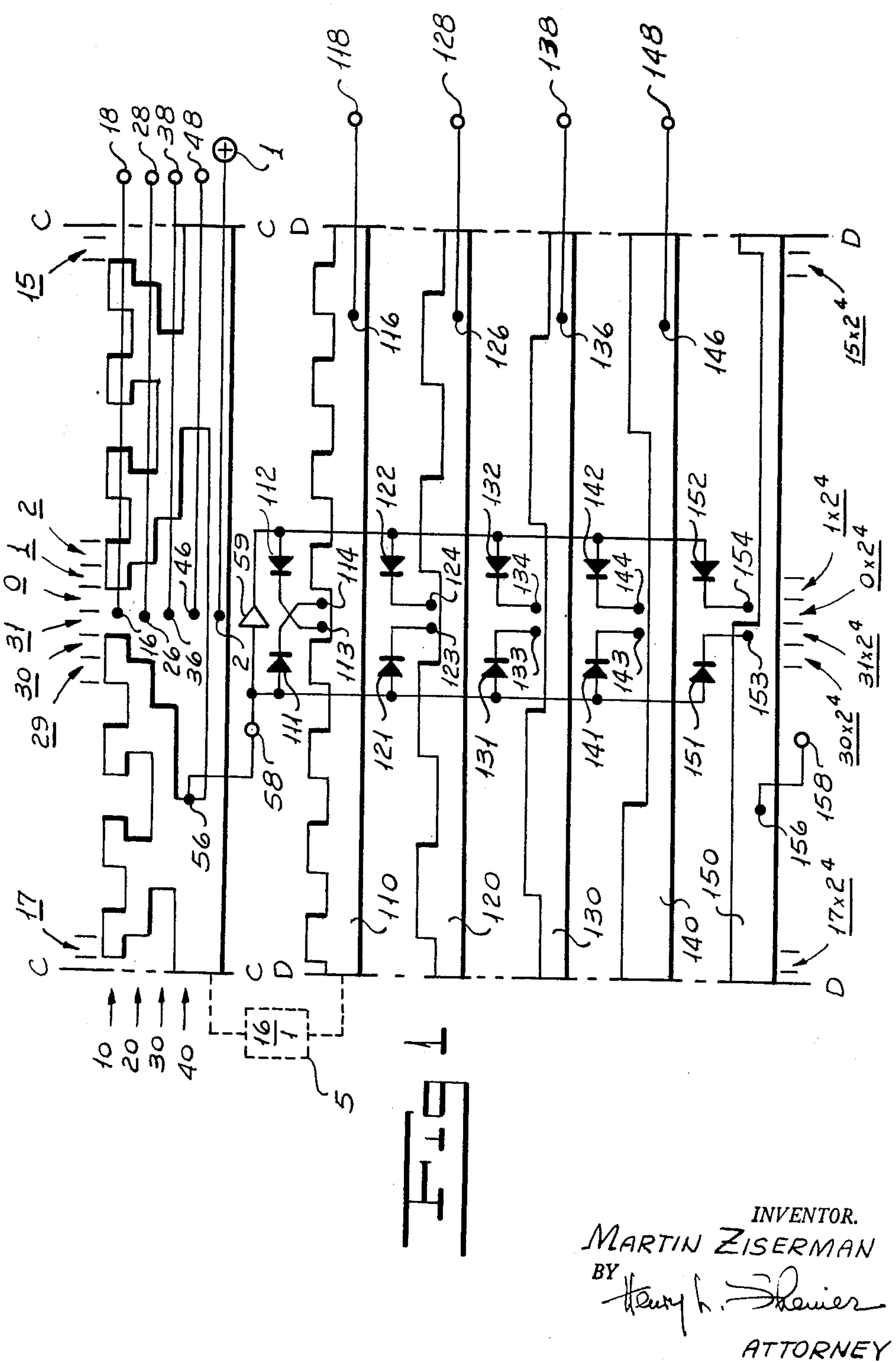
FIGURE 1 is a developed schematic view of a first embodiment of my invention in which the low speed disk comprises a number of electrically isolated circles corresponding to the number of bits generated by the low speed pattern.

Referring more particularly now to FIGURE 1, the high speed pattern comprises four circles of elements indicated generally by the reference numerals 10, 20, 30, and 40. Circle 10 is provided with eight conductive segments and eight nonconductive intersegmental spaces. Circle 20 is provided with four conductive segments and four intersegmental spaces. Circle 30 is provided with two segments and two spaces. And circle 40 is provided with one segment and one space. All of the conductive elements of circles 10 through 40 are connected to a common slip ring which is contacted by a brush 2. Brush 2 is connected to a source of positive input excitation voltage 1. The high speed pattern has a maximum capacity of 32 comprising the counts $\underline{0}$, $\underline{1}$, $\underline{2}$, . . . , $\underline{15}$, $\underline{16}$, $\underline{17}$, . . . , $\underline{29}$, $\underline{30}$, and $\underline{31}$ as indicated by the underlined numerals. The high speed pattern is mounted on a nonconductive disk which is shown cut radially along C—C and developed. Line C—C is located at the midpoint of the count of $\underline{16}$. Brushes 16, 26, 36, and 46 are radially aligned and disposed to contact alternately the segments and spaces of circle 10, 20, 30, and 40, respectively. Brush 56 is disposed to contact alternately the segment and space of circle 40 and is disposed 90° from brush 46. Brushes 16, 26, 36, and 46 are connected to output terminals 18, 28, 38, and 48, respectively. Brush 56 is connected to a terminal 58. The low speed pattern comprises electrically isolated circles 110, 120, 130, 140, and 150. Circle 110 comprises eight segments and eight spaces. Circle 120 comprises four segments and four spaces. Circle 130 comprises two segments and two spaces. And each of circles 140 and 150 comprises one segment and one space. The segments of circle 110 are connected to a common slip ring which is contacted by a brush 116. The segments of circle 120 are connected to a common slip ring which is contacted by brush 126. The segments of circle 130 are connected to a common slip ring which is contacted by a brush 136. The segment of circle 140 is connected to a slip ring which is contacted by a brush 146. And the segment of circle 150 is connected to a slip ring which is contacted by a brush 156. The maximum capacity of the encoder considering both high and low speed disks is $32\times 2^4$. The low speed pattern provides the counts $\underline{0\times 2^4}$, $\underline{1\times 2^4}$, . . . , $\underline{15\times 2^4}$, $\underline{16\times 2^4}$, $\underline{17\times 2^4}$, . . . , $\underline{30\times 2^4}$, and $\underline{31\times 2^4}$, as indicated by the underlined symbols. Circles 110 through 150 are mounted on a nonconductive disk which is shown cut radially along line D—D and developed. Line D—D is located at the midpoint of the count of $\underline{16\times 2^4}$. The high speed and low speed disks are connected by reduction gearing 5 such that sixteen revolutions of the high speed disk are required to produce one revolution of the low speed disk. The low speed pattern thus counts half revolutions of the high speed pattern. Brushes 116, 126, 136, 146, and 156 are connected to output terminals 118, 128, 138, 148, and 158, respectively. Terminal 58 is connected to the input of an inverter 59 which should have a low output impedance. The output of inverter 59 is complementary to its input appearing at terminal 58. When terminal 58 is a positive potential equal to that at terminal 1, by virtue that brush 56 contacts the segment of circle 40, the output of inverter 59 should rest at ground representing a "0." When terminal 58 rests at ground representing a "0," by virtue that brush 56 lies in the space of circle 40, the output of inverter 59 should be a positive potential equal to that supplied at terminal 1. Terminal 58 is connected forwardly through a crystal 111 to a brush 114. The output of inverter 59 is connected forwardly through a crystal 112 to a brush 113. Brushes 113 and 114 are disposed to contact the segments of circle 110. Terminal 58 is also connected forwardly through a crystal 121 to a brush 123, forwardly through a crystal 131 to a brush 133, forwardly through a crystal 141 to a brush 143, and forwardly through a crystal 151 to a brush 153. The output of inverter 59 is also connected forwardly through a crystal 122 to a brush 124, forwardly through a crystal 132 to a brush 134, forwardly through a crystal 142 to a brush 144, and forwardly through a crystal 152 to a brush 154. Brushes 123 and 124 are disposed to contact the segments of circle 120; brushes 133 and 134 are disposed to contact the segments of circle 130; brushes 143 and 144 are disposed to contact alternately the segment and space of circle 140; and brushes 153 and 154 are disposed to contact alternately the segment and space of circle 150. Brushes 113 and 114 are spaced apart half the length of arc subtended by a segment or space of circle 110. Pairs of brushes 123 and 124, 133 and 134, 143 and 144, and 153 and 154 have the same spacing as the pair of brushes 113 and 114. Thus each pair of brushes has a spacing of $\frac{1}{32}$ revolution or 11.25°.

If only a single pattern were used, the signal at terminal 58 would represent the most significant digit; and this would be the next more significant digit than the signal at output terminal 48. However, for a plurality of patterns, the next more significant digit than the signal at output terminal 48 appears at output terminal 118. Hence in a muliple-pattern encoder, the most significant digit (terminal 58) of the high speed pattern is lost and is replaced by the least significant digit (terminal 118) of the low speed pattern. The low speed pattern counts in increments of $2^4=16$, while the capacity of the high speed pattern is apparently $2^5=32$. The loss of the bit at terminal 58 reduces the capacity of the encoder from an apparent value of $32\times 2^5$ to an actual value of $32\times 2^4$, but creates a redundancy which enables the elimination of ambiguities. The low speed pattern counts half revolutions of the high speed disk representing increments of $2^4=16$. Thus when the high speed pattern is between the counts of $\underline{0}$ and $\underline{15}$, the count of the low speed disk is an even number of increments of $2^4$; and when the high speed pattern is between the counts of $\underline{16}$ and $\underline{31}$, the count of the low speed disk is an odd number of increments of $2^4$.

The encoder is shown at the recycling point, where the count of the high speed disk changes from $\underline{31}$ to $\underline{0}$ and the count of the low speed disk changes from $\underline{31\times 2^4}$ to $\underline{0\times 2^4}$. At the recycling point the representation changes from 511 to 0. The reflected binary representation of 511 is 100,000,000. At the recycling point brushes 153 and 154 symmetrically straddle a transfer point of circle 150. If brush 56 contacts the segment of circle 40, then a signal is impressed on terminal 58 which is coupled through crystal 151 to brush 153. Since brush 153 contacts the segment of circle 150, a "1" will appear at output terminal 158. Now let us consider that the patterns move to the left under the staionary brushes. Brush 56 will immediately break contact with the segment of circle 40, causing conduction to shift from lagging brush 153 to leading brush 154. Since brush 154 lies in the space of circle 150, output terminal 158 drops to ground representing a "0"; and the output representation changes from 511 to 0. Upon the rotation of the high speed disk through one-quater revolution, the low speed disk rotates through $\frac{1}{64}$ revolution. Leading brush 114 contacts a segment of circle 110; and lagging brush 153 breaks contact with the segment of circle 150. But since neither of brushes 114 or 153 carries a signal, the output representation remains unchanged. Upon the rotation of the high speed disk through one-half revolution from the position shown, the low speed disk rotates through $\frac{1}{32}$ revolution. Brushes 113 and 114 now symmetrically straddle a transfer point of circle 110; and brush 56 contacts the segment of circle 40. Conduction shifts from lagging brush 113 to leading brush 114. Since brush 114 contacts a segment of circle 110, the output at terminal 118 becomes positive representing a "1." Upon the rotation of the high speed disk through three-quarters revolution from the position shown, the low speed disk rotates through $\frac{3}{64}$ revolution. Lagging brush 113 contacts a segment of circle 110; and leading brush 124 contacts a segment of circle 128. But since neither of brushes 113 or 124 carries a signal, the output representation remains unchanged. Upon the rotation of the high speed disk through one revolution from the position shown, the low speed disk rotates through $\frac{1}{16}$ revolution. Brushes 123 and 124 now symmetrically straddle a transfer point of circle 120; and brush 56 breaks contact with the segment of circle 40. Conduction shifts from lagging brush 123 to leading brush 124. Since brush 124 contacts a segment of circle 120, the output at terminal 128 becomes positive representing a "1." Half of the transfer points of the low speed disk are accommodated by circle 110. The remaining half of the transfer points of the low speed disk are accommodated by circles 120 through 150. The various transfer points of circle 110 alternate with those of circles 120 through 150. It will be noted that the connections to input brushes 113 and 114 of circle 110 are of opposite polarity to the connections to the pairs of input brushes of circles 120 through 150. At the low-speed transfer point between the counts of $\underline{31\times 2^4}$ and $\underline{0\times 2^4}$, conduction shifts from lagging brush 153 to leading brush 154, while simultaneously shifting from leading brush 114 to lagging brush 113. At the low-speed transfer point between the counts of $\underline{0\times 2^4}$ and $\underline{1\times 2^4}$, conduction shifts from lagging brush 113 to leading brush 114, while simultaneously shifting from leading brush 154 to lagging brush 153 and from leading brush 124 to lagging brush 123. At the transfer point between the counts of $\underline{1\times 2^4}$ and $\underline{2\times 2^4}$, conduction shifts from lagging brush 123 to leading brush 124, while simultaneously shifting from leading brush 114 to lagging brush 113. Thus the count of the low speed disk is changed each time brush 56 breaks contact or makes contact with the segment of circle 40. Whenever brush 56 makes contact with the segment of circle 40, the change in count is produced by circle 110. Whenever brush 56 breaks contact with the segment of circle 40, the change in count is produced by one of circles 120 through 150.

Figure 2:
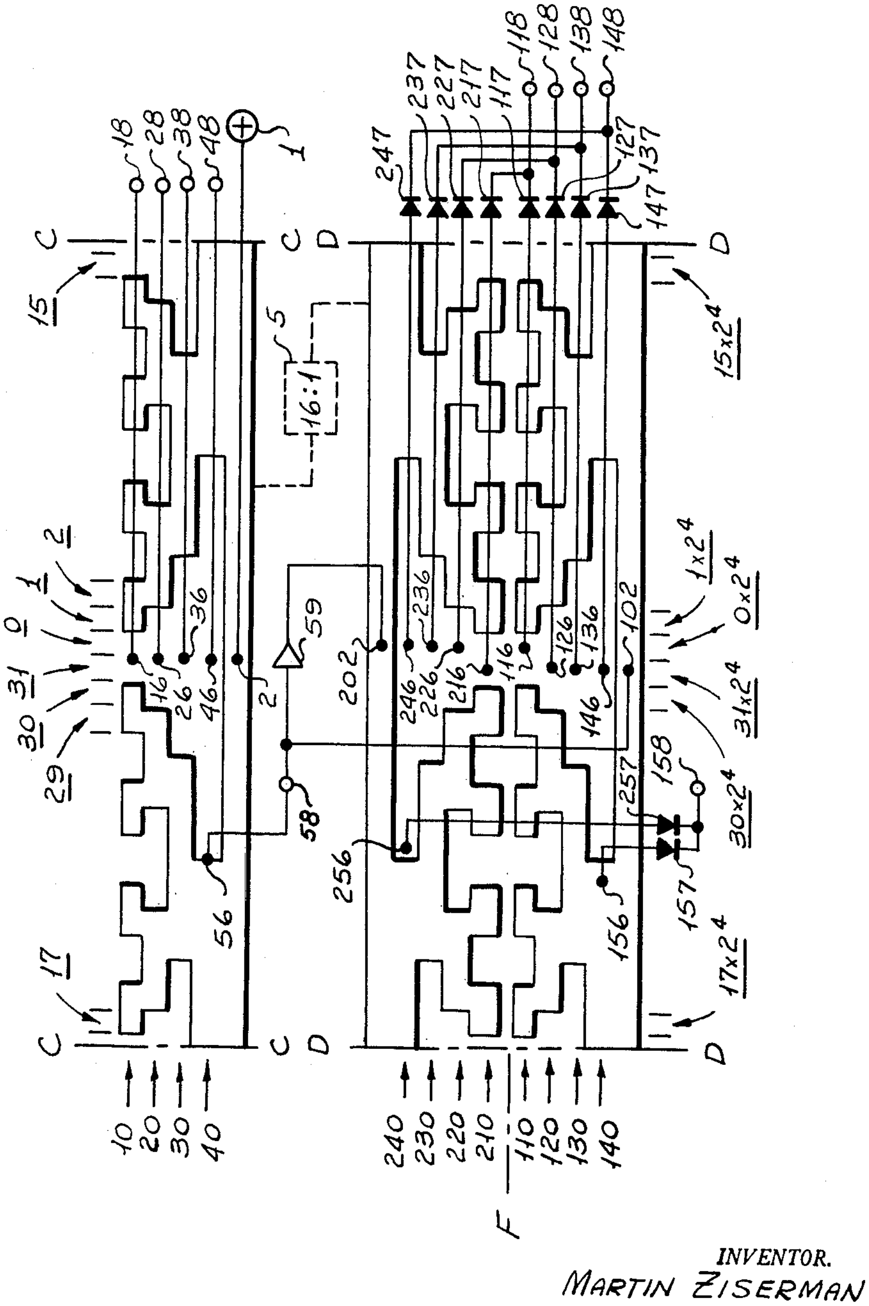
FIGURE 2 is a developed schematic view of a second embodiment and preferred embodiment of my invention in which the low speed disk comprises a pair of electrically isolated patterns each of which is similar to the high speed pattern.

Referring now to FIGURE 2, the high speed disk and the disposition of the brushes and the connection of the brushes to the output terminals and the arrangement of segments and spaces in the pattern are identical to FIGURE 1. In FIGURE 2, however, the low speed disk comprises a first group of circles 110, 120, 130, and 140 all connected to a common slip ring which is contacted by a brush 102 and a second group of circles 210, 220, 230, and 240 all connected to a common slip ring which is contacted by a brush 202. The pattern of each of the two groups of circles is identical to the pattern used for the circles of the high speed disk. The high and low speed disks are again connected by 16-to-1 speed reduction gearing 5. Brushes 116, 126, 136, and 146 are disposed to contact alternately the segments and spaces of circles 110, 120, 130, and 140, respectively. Brushes 216, 226, 236, and 246 are disposed to contact alternately the segments and spaces of circles 210, 220, 230, and 240, respectively. The group of brushes comprising brushes 216, 126, 136, and 146 are radially aligned. Brush 156 is disposed to contact alternately the segment and space of circle 140 and is displaced 90° from brush 146. The group of brushes comprising brushes 116, 226, 236, and 246 are radially aligned. Brush 256 is disposed to contact alternately the segment and space of circle 240 and is displaced 90° from brush 246. The two groups of brushes are spaced apart half the length of arc subtended by a segment or a space of circle 110 or circle 210. Thus the pair of brushes 116 and 216 have a spacing of $\frac{1}{32}$ revolution or 11.25°; and the pair of brushes 126 and 226 have a similar spacing; and the pair of brushes 156 and 256 are likewise spaced apart by 11.25°. Brushes 116 and 216 are connected forwardly through respective crystals 117 and 217 to output terminal 118; brushes 126 and 226 are connected forwardly through respective crystals 127 and 227 to output terminal 128; brushes 136 and 236 are connected forwardly through respective crystals 137 and 237 to output terminal 138; brushes 136 and 246 are connected forwardly through respective crystals 147 and 247 to output terminal 148; and brushes 156 and 256 are connected forwardly through respective crystals 157 and 257 to output terminal 158. The first group of circles 110 through 140 are mounted on one side of a nonconductive disk; and the second group of circles 210 through 240 are mounted on the opposite side of the disk. This disk, carrying similar patterns on opposite sides, is shown cut radially along line D—D and developed. The two patterns on opposite surfaces of the disk are shown rotated 90° in opposite directions about line F representing the periphery of the disk, in order that both patterns may be simultaneously presented in a developed view.

The encoder is again shown at the recycling point where the count of the high speed disk changes from $\underline{31}$ to $\underline{0}$ and the count of the low speed disk changes from $\underline{31\times 2^4}$ to $\underline{0\times 2^4}$. At the recycling point brushes 156 and 256 symmetrically straddle corresponding and radially aligned transfer points of circles 140 and 240, respectively. If brush 56 contacts the segment of circle 40, then a signal is impressed on terminal 58 and on brush 102, energizing the first group of circles 110 through 140. Since brush 156 contacts the segment of circle 140, a signal is coupled forwardly through crystal 157 to output terminal 158, producing a "1" thereat. As the patterns move to the left under the stationary brushes, brush 56 immediately breaks contact with the segment of circle 40, causing terminal 58 and brush 102 to drop to ground potential. When the input of inverter 59 drops to ground potential, its output changes from ground to a positive potential equal to that supplied at terminal 1. Thus conduction shifts from brush 102 to brush 202, de-energizing the first group of circles 110 through 140 and energizing the second group of circles 210 through 240. Since leading brush 256 lies within the space of circle 240, output terminal 158 drops to ground potential representing a "0"; and the output representation changes from 511 to 0. Upon one-quarter revolution of the high speed disk, the low speed disk rotates through $\frac{1}{64}$ revolution. Leading brush 116 contacts a segment of circle 110; and lagging brush 156 breaks contact with the segment of circle 140. But since the first group of circles 110 through 140 is not energized, the output representation remains unchanged. Upon the rotation of the high speed disk through one-half revolution from the position shown, the low speed disk rotates through $\frac{1}{32}$ revolution. Brushes 116 and 216 now symmetrically straddle corresponding and radially aligned transfer points of circles 110 and 210, respectively; and brush 56 contacts the segment of circle 40. Conduction shifts from the second group of circles 210 through 240 to the first group of circles 110 through 140. Since brush 116 contacts a segment of circle 110, a positive signal is coupled forwardly through crystal 117 to terminal 118, representing a "1" thereat. Upon the rotation of the high speed disk through three-quarters revolution from the position shown, the low speed disk rotates through $\frac{3}{64}$ revolution. Lagging brush 216 contacts a segment of circle 210; and leading brush 226 contacts a segment of circle 220. But since the second group of circles 210 through 240 is not energized, the output representation remains unchanged. Upon the rotation of the high speed disk through one revolution from the position shown, the low speed disk rotates through $\frac{1}{16}$ revolution. Brushes 126 and 226 symmetrically straddle corresponding and radially aligned transfer points of circles 120 and 220, respectively; and brush 56 breaks contact with the segment of circle 40. Conduction shifts from the first group of circles 110 through 140 to the second group of circles 210 through 240. Since brush 226 contacts a segment of circle 220, a signal is coupled forwardly through crystal 227 to output terminal 128, representing a "1" thereat. Half of the transfer points of the low speed disk are accommodated by circles 110 and 210. The remaining half of the transfer points of the low speed disk are accommodated by circles 120 through 140 and 220 through 240. The various transfer points of circles 110 and 210 alternate with those of circles 120 through 140 and 220 through 240. It will be noted that the alignment of brushes 116 and 216 of circles 110 and 210 is of opposite polarity to that of the brushes of circles 120 through 140 and 220 through 240. At the low speed transfer point between the counts of $\underline{31\times 2^4}$ and $\underline{0\times 2^4}$, conduction shifts from the first group of circles associated with lagging brush 156 and leading brush 116 to the second group of circles associated with leading brush 256 and lagging brush 216. At the low speed transfer point between the counts of $\underline{0\times 2^4}$ and $\underline{1\times 2^4}$, conduction shifts from the second group of circles associated with lagging brush 216 and leading brush 256 and leading brush 226 to the first group of circles associated with leading brush 116 and lagging brush 156 and lagging brush 126. At the transfer point between the counts of $\underline{1\times 2^4}$ and $\underline{2\times 2^4}$, conduction shifts from the first group of circles associated with lagging brush 126 and leading brush 116 to the second group of circles associated with leading brush 226 and lagging brush 216. The count of the low speed disk is again, as in FIGURE 1, changed each time brush 56 breaks contact or makes contact with the segment of circle 40. Whenever brush 56 makes contact with the segment of circle 40, the change in count is produced by circles 110 and 210. Whenever brush 56 breaks contact with the segment of circle 40, the change in count is produced by one of circles 120 through 140 and the corresponding one of circles 220 through 240. The provision of the OR circuit crystals 117 through 157 and 217 through 257 prevents the simultaneous energization of both groups of circles.

It will be appreciated that the two groups of circles of the low speed disk may be mounted on opposite sides as described or alternatively may be mounted on the same side concentrically or may be mounted on separate disks mounted for common rotation on the same shaft.

While I have shown an equal number of segments for the high speed and low speed disks, it will be appreciated by those skilled in the art that I may provide more segments and spaces on the high speed disk than on the low speed disk.

It will be noted that in the high speed patterns of FIGURES 1 and 2 and in the low speed pattern of FIGURE 2, circles 40 and also the pair of circles 140 and 240 provide two digits by the 90° disposition of brushes 56 and also the pair of brushes 156 and 256.

In the low speed disk of FIGURE 1, I must provide three brushes for the generation of each bit. Since in FIGURE 1 the low speed disk provides five bits, there are fifteen brushes. In the low speed disk of FIGURE 2, I need provide only two brushes for the generation of each bit plus the two additional input brushes 101 and 102. Thus in FIGURE 2, for the generation of the five low speed bits, I need provide only twelve brushes, rather than the fifteen required for the low speed disk in FIGURE 1.

As the number of low speed bits is increased, the reduction in the number of brushes becomes more significant.

For the low speed disk in FIGURE 1, there are five circles and five slip rings which comprise a total of ten tracks. Furthermore there must be some spacing between the circles in order to permit of electrical isolation. There are four bands of insulation between the five circles. These insulating bands however may be small compared with the radial width of a track. If, for the low speed disk in FIGURE 2, both groups of circles were concentrically mounted on the same side, a total of ten tracks would again be required; eight of the tracks would accommodate circles and the two additional tracks would accommodate slip rings. Thus both in FIGURE 1 and in FIGURE 2 the total number of low speed tracks required is the same. However, in FIGURE 2 only one insulating band is required to separate the two groups of circles. The radial width of the low speed disk of FIGURE 2, even with both groups of circles mounted on the same side, will be less than that of the low speed disk of FIGURE 1 by three insulating bands. Furthermore, since in FIGURE 2 the pattern of each of the two groups of circles of the low speed disk may be identical to that of the high speed disk, the cost of construction will be reduced. Hence the embodiment of my invention shown in FIGURE 2 is to be preferred.

It will be appreciated by those skilled in the art that if it is desired to provide a three-speed encoder then the outputs at terminals 158 in FIGURES 1 and 2 may be used to generate the least significant digit of a third pattern, reduction-geared to the second pattern, in a similar manner to that in which the outputs at terminals 58 are employed to generate the outputs at terminals 118. In such event the outputs at terminals 158 would be lost in order to create a redundancy which would eliminate ambiguities for such third pattern disk. The pattern of the third disk may be identical to either of the low speed patterns of FIGURES 1 and 2. The capacity of the encoder would be increased then by a factor of 16 from 512 to 8,182. The reduction gearing between the low speed disk in FIGURES 1 and 2 and such third disk would again be 16-to-1.

It will be seen that I have accomplished the objects of my invention. My encoder has a high capacity; and the maximum count may be increased without limit by the appropriate provision of additional reduction-geared pattern disks. My multiple disk encoder provides a reflected binary count without ambiguity despite the usual uncertainties of manufacturing tolerances. My encoder is of inexpensive construction, especially in the embodiment of FIGURE 2. My encoder is reliable in operation because of the elimination of ambiguities without electronic complexity.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A multiple-pattern reflected binary encoder including in combination, a first rotatable member, means including means mounted on the first member for providing a reflected binary count containing a plurality of digits and having a most significant digit, said reflected binary count means comprising a circular segment subtending 180° and a pair of signal sensing devices disposed in 90° phase-displaced signal-sensing relationship with the circular segment, one sensing device providing said most significant digit and the other sensing device providing next-to-most significant digit, means responsive only to said most significant digit for providing a pair of complementary signals, a second rotatable member, reduction gearing means interconnecting the first and second members, the rotational speed of the second member being less than that of the first member, generating means mounted on the second member, means coupling the pair of complementary signals to the generating means, and means responsive to the generating means for providing a least significant output bit having the same significance as said most significant digit.

2. A multiple-pattern reflected binary encoder including in combination a first rotatable member, means including means mounted on the first member for providing a reflected binary count containing a plurality of digits and having a most significant digit, means responsive only to said most significant digit for providing a pair of complementary signals, a second rotatable member, reduction gearing means interconnecting the first and second members, the rotational speed of the second member being less than that of the first member by an even whole number factor, generating means including circularly disposed means mounted on the second member and a first and a second signal coupling device, the first and second devices being disposed in phase-displaced signal-coupling relationship with the circular means, the first and second devices having a phase displacement equal to 360° divided by twice said factor of gear reduction, means coupling the pair of complementary signals to the generating means, one signal being associated only with the first of the coupling devices and the other signal being associated only with the second of the coupling devices, and means responsive to the generating means for providing a least significant output bit having the same significance as said most significant digit.

3. A multiple-pattern reflected binary encoder including in combination a first rotatable member, means including means mounted on the first member for providing a reflected binary count containing a plurality of digits and having a most significant digit, said reflected binary count means comprising a circular segment subtending 180° and a pair of signal sensing devices disposed in 90° phase-displaced signal-sensing relationship with the circular segment, one sensing device providing said most significant digit and the other sensing device providing a next-to-most significant digit, means responsive only to said most significant digit for providing a pair of complementary signals, a second rotatable member, reduction gearing means interconnecting the first and second members, the rotational speed of the second member being less than that of the first member, first generating means including circularly disposed first means mounted on the second member and a first and a second signal coupling device, second generating means including circularly disposed second means mounted on the second member and a third and a fourth signal coupling device, the first and second circularly disposed means being electrically isolated, the first and second devices being disposed in phase-displaced signal-coupling relationship with the first circular means, the third and fourth devices being disposed in phase-displaced signal-coupling relationship with the second circular means, means coupling the pair of complementary signals to the first and second generating means, and means responsive to the first and second generating means for providing at least significant output bits having the same significance as said most significant digit and an output bit of gerater significance.

4. A multiple-pattern reflected binary encoder including in combination a first rotatable member, means including means mounted on the first member for providing a reflected binary county containing a plurality of digits and having a most significant digit, means responsive only to said most significant digit for providing a pair of complementary signals, a second rotatable member, reduction gearing means interconnecting the first and second members, the rotational speed of the second member being less than that of the first member by an even whole number factor, first generating means including circularly disposed first means mounted on the second member and a first and a second signal coupling device, the first and second devices being disposed in phase-displaced signal-coupling relationship with the first circular means, the first and second devices having a predetermined phase displacement equal to 360° divided by twice said factor of gear reduction, second generating means including circularly disposed second means mounted on the second member and a third and a fourth signal coupling device, the third and fourth devices being disposed in phase-displaced signal-coupling relationship with the second circular means, the third and fourth devices having said predetermined phase displacement, the first and second circularly disposed means being electrically isolated, means coupling the pair of complementary signals to the first and second generating means, and means responsive to the first and second generating means for providing a least significant output bit having the same significance as said most significant digit and an output bit of greater significance.

5. A multiple-pattern reflected binary encoder including in combination a first rotatable member, means including means mounted on the first member for providing a reflected binary count containing a plurality of digits and having a most significant digit, means responsive only to said most significant digit for providing a pair of complementary signals, a second rotatable member, reduction gearing means interconnecting the first and second members, the rotational speed of the second member being less than that of the first member, a first circle comprising an electrically conductive segment mounted on the second member, a second circle comprising an electrically conductive segment mounted on the second member, the first and second circles being electrically isolated, a first and a second signal coupling device disposed in phase-displaced signal-coupling relationship with the first circle, a third and a fourth signal coupling device disposed in phase-displaced signal-coupling relationship with the second circle, for one direction of rotation of the second member the phase of the first device leading that of the second device and the phase of the third device lagging that of the fourth device, means coupling one of the complementary signals to the first and third devices, means coupling the other of the complementary signals to the second and fourth devices, means responsive to the first circle for providing a least significant output bit having the same significance as said most significant digit and means responsive to the second circle for providing an output bit of greater significance.

6. A multiple-pattern reflected binary encoder including in combination a first rotatable member, means including means mounted on the first member for providing a reflected binary count containing a plurality of digits and having a most significant digit, means responsive only to said most significant digit for providing a pair of complementary signals, a second rotatable member, reduction gearing means interconnecting the first and second members, the rotational speed of the second member being less than that of the first member by an even whole number factor, a first circle comprising at least one electrically conductive segment mounted on the second member, the number of first circle segments being equal to half said factor of gear reduction, a second circle comprising an electrically conductive segment mounted on the second member, the first and second circles being electrically isolate, a first and a second signal coupling device disposed in phase-displaced signal-coupling relationship with the first circle, the first and second devices having a predetermined phase displacement equal to 360° divided by twice said factor of gear reduction, a third and a fourth signal coupling device disposed in phase-displaced signal-coupling relationship with the second circle, the third and fourth devices having said predetermined phase displacement, for one direction of rotation of the second member the phase of the first device lagging that of the second device and the phase of the third device leading that of the fourth device, means including a first pair of unilateral impedances for coupling one of the complementary signals to the first and third devices, means including a second pair of unilateral impedances for coupling the other of the complementary signals to the second and fourth devices, means responsive to the first circle for providing a least significant output bit having the same significance as said most significant digit, and means responsive to the second circle for providing an output bit of greater significance.

7. A multiple-pattern reflected binary encoder including in combination a first rotatable member, means including means mounted on the first member for providing a reflected binary count containing a plurality of digits and having a most significant digit, means responsive only to said most significant digit for providing a pair of complementary signals, a second rotatable member, reduction gearing means interconnecting the first and second members, the rotational speed of the second member being less than that of the first member, a first circle comprising at least one electrically conductive segment mounted on the second member, a second circle comprising at least one electrically conductive segment mounted on the second member, the first and second circles having equal numbers of segments, the first and second circles being electrically isolate, means coupling one of the complementary signals only to the first circle, means coupling the other of the complementary signals only to the second circle, a first signal sensing device disposed in signal-sensing relationship with the first circle, a second signal sensing device disposed in a relatively phase displaced signal-sensing relationship with the second circle, and means responsive to the first and second devices for providing a least significant output bit having the same significance as said most significant digit.

8. A multiple-pattern reflected binary encoder including in combination a first rotatable member, means including means mounted on the first member for providing a reflected binary count containing a plurality of digits and having a most significant digit, means responsive only to said most significant digit for providing a pair of complementary signals, a second rotatable member, reduction gearing means interconnecting the first and second members, the rotational speed of the second member being less than that of the first member by an even whole number factor, a first electrically conductive circular segment mounted on the second member, a second electrically conductive circular segment mounted on the second member, the first and second segments being similar and electrically isolate and each subtending 180°, means coupling one of the complementary signals only to the first segment, means coupling the other of the complementary signals only to the second segment, a first and a second signal sensing device disposed in phase-displaced signal-sensing relationship with the first segment, the first and second devices having a phase displacement of 90°, a third and a fourth signal sensing device disposed in phase-displaced signal-sensing relationship with the second segment, the third and fourth devices having a phase displacement of 90°, the first and third devices having a predetermined relative phase displacement equal to 360° divided by twice said factor of gear reduction, the second and fourth devices having said predetermined relative phase displacement, means responsive to the first and third devices for providing a most significant bit output, and means responsive to the second and fourth devices for providing a next-to-most significant bit output.

9. A multiple-pattern reflected binary encoder including in combination a first rotatable member, means including means mounted on the first member for providing a reflected binary count containing a plurality of digits and having a most significant digit, means responsive only to said most significant digit for providing a pair of complementary signals, a second rotatable member, reduction gearing means interconnecting the first and second members, the rotational speed of the second member being less than that of the first member, a first circle comprising at least one electrically conductive segment mounted on the second member, a second circle comprising at least one electrically conductive segment mounted on the second member, the first and second circles having equal numbers of segments, the first and second circles being electrically isolate, a first electrically conductive circular segment mounted on the second member, a second electrically conductive circular segment mounted on the second member, the first and second circular segments being electrically isolate, the first circle and the first circular segment being electrically connected, the second circle and the second circular segment being electrically connected, means coupling one of the complementary signals only to the first circle and the first circular segment, means coupling the other of the complementary signals only to the second circle and the second circular segment, a first signal sensing device disposed in signal-sensing relationship with the first circle, a second signal sensing device disposed in a relatively phase displaced signal-sensing relationship with the second circle, a third signal sensing device disposed in signal-sensing relationship with the first circular segment, a fourth signal sensing device disposed in a relatively phase-displaced signal-sensing relationship with the second circular segment, for one direction of rotation of the second member the phase of the first device leading that of the second device and the phase of the third device lagging that of the fourth device, means responsive to the third and fourth devices for providing a most significant output bit, and means responsive to the first and second devices for providing a least significant output bit having the same significance as said most significant digit.

10. A multiple-pattern reflected binary encoder including in combination a first rotatable member, means including means mounted on the first member for providing a reflected binary count containing a plurality of digits and having a most significant digit, means responsive only to said most significant digit for providing a pair of complementary signals, a second rotatable member, reduction gearing means interconnecting the first and second members, the rotational speed of the second member being less than that of the first member by an even whole number factor at least equal to four, a first circle comprising a number of electrically conductive segments mounted on the second member, a second circle comprising an equal number of electrically conductive segments mounted on the second member, the number of segments of each of the first and second circles being equal to half said factor of gear reduction, the first and second circles being similar and electrically isolate, a first electrically conductive circular segment mounted on the second member, a second electrically conductive circular segment mounted on the second member, the first and second circular segments being electrically isolate and each subtending 180°, the first circle and the first circular segment being electrically connected, the second circle and the second circular segment being electrically connected, means coupling one of the complementary signals only to the first circle and the first circular segment, means coupling the other of the complementary signals only to the second circle and the second circular segment, a first signal sensing device disposed in signal-sensing relationship with the first circle, a second signal sensing device disposed in a relatively phase-displaced signal-sensing relationship with the second circle, the first and second devices having a predetermined relative phase-displacement equal to 360° divided by twice said factor of gear reduction, a third and a fourth signal sensing deivce disposed in phase-displaced signal-sensing relationship with the first circular segment, the third and fourth devices having a phase displacement of 90°, a fifth and a sixth signal sensing device disposed in phase-displaced signal-sensing relationship with the second circular segment, the fifth and sixth devices having a phase displacement of 90°, the third and fifth devices having said predetermined relative phase displacement, the fourth and sixth devices having said predetermined relative phase displacement, for one direction of rotation of the second member the phase of the first device leading that of the second device and the phase of the third device lagging that of the fifth device and the phase of the fourth device lagging that of the sixth device, means responsive to the fourth and sixth devices and including a first pair of unilateral impedances for providing a most significant bit output, means responsive to the third and fifth devices and including a second pair of unilateral impedances for providing a next-to-most significant bit output, and means responsive to the first and second devices and including a third pair of unilateral impedances for providing a least significant bit output having the same significance as said most significant digit.

References Cited in the file of this patent

UNITED STATES PATENTS

| | | |
|---|---|---|
| 2,793,807 | Yaeger | May 28, 1957 |
| 2,852,764 | Frothingham | Sept. 16, 1958 |
| 2,873,440 | Speller | Feb. 10, 1959 |
| 2,873,442 | Ziserman | Feb. 10, 1959 |
| 2,943,311 | Hulst | June 28, 1960 |